US006763073B2

(12) United States Patent
Foschini et al.

(10) Patent No.: US 6,763,073 B2
(45) Date of Patent: Jul. 13, 2004

(54) WIRELESS COMMUNICATIONS SYSTEM HAVING A SPACE-TIME ARCHITECTURE EMPLOYING MULTI-ELEMENT ANTENNAS AT BOTH THE TRANSMITTER AND RECEIVER

(75) Inventors: Gerard Joseph Foschini, Sayreville, NJ (US); Glenn David Golden, Boulder, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/882,120

(22) Filed: Jun. 15, 2001

(65) Prior Publication Data

US 2001/0050964 A1 Dec. 13, 2001

Related U.S. Application Data

(63) Continuation of application No. 09/060,657, filed on Apr. 15, 1998, now Pat. No. 6,317,466.

(51) Int. Cl.[7] .............................................. H04L 27/28
(52) U.S. Cl. ........................................ 375/260; 455/69
(58) Field of Search ................................ 375/346, 349, 375/267, 299, 260, 347; 455/63, 65, 69.3, 69, 103

(56) References Cited

U.S. PATENT DOCUMENTS

| | | | |
|---|---|---|---|
| 4,530,087 A | 7/1985 | Yamamoto | 370/350 |
| 4,710,944 A | 12/1987 | Nossen | 375/267 |
| 5,151,919 A | 9/1992 | Dent | 370/209 |
| 5,203,018 A | 4/1993 | Hirose | 455/61 |
| 5,260,968 A | 11/1993 | Gardner et al. | 375/200 |
| 5,289,499 A | 2/1994 | Weerackody | 375/206 |
| 5,345,599 A * | 9/1994 | Paulraj et al. | 455/500 |
| 5,442,625 A | 8/1995 | Gitlin et al. | 370/342 |
| 5,448,602 A | 9/1995 | Ohmori et al. | 375/347 |
| 5,469,465 A | 11/1995 | Birchler et al. | 375/346 |
| 5,481,570 A | 1/1996 | Winters | 375/347 |
| 5,579,304 A | 11/1996 | Sugimoto et al. | 370/342 |
| 5,787,122 A | 7/1998 | Suzuki | 375/267 |
| 5,796,775 A | 8/1998 | Aoyama | 375/208 |
| 5,831,977 A | 11/1998 | Dent | 370/335 |
| 5,832,044 A | 11/1998 | Sousa et al. | 375/347 |
| 5,889,826 A | 3/1999 | Takahashi | 375/347 |
| 5,933,421 A * | 8/1999 | Alamouti et al. | 370/330 |
| 5,960,039 A | 9/1999 | Martin et al. | 375/267 |
| 6,058,105 A | 5/2000 | Hochwald et al. | 370/310 |
| 6,097,771 A * | 8/2000 | Foschini | 375/346 |
| 6,115,427 A | 9/2000 | Calderbank et al. | 375/267 |

FOREIGN PATENT DOCUMENTS

| | | | | |
|---|---|---|---|---|
| EP | 0 817 401 A | 1/1998 | | H01Q/3/26 |
| EP | 0 905 920 A | 3/1999 | | H04B/7/204 |

OTHER PUBLICATIONS

European Search Report, Apr. 22, 2003, Application No. 99302692.1–1248, Lucent Technologies.

(List continued on next page.)

Primary Examiner—Stephen Chin
Assistant Examiner—Kevin Kim
(74) Attorney, Agent, or Firm—E. J. Rosenthal (57) ABSTRACT

The bit rate at which a digital wireless communications system communicates data in scattering environments may be significantly increased by using multiple antennas at both the transmitter and receiver and by decomposing the channel into m subchannels. In the same frequency band, m one dimensional signals are transmitted into a scattering environment which makes these transmitted signals appear spatially independent at the receiver antenna array. The high bit rate is enabled by special receiver processing to maximize the minimum signal-to-noise ratio of the receiver detection process.

9 Claims, 5 Drawing Sheets

OTHER PUBLICATIONS

Chiznik, Foschini and Valenzuela, Capacities of Multi-Element Transmit and Receive Antennas: Correlations and Keyholes:, *Electronics Letters*, vol. 36, No. 13, Jun. 22, 2000, pp. 1099–1100.

Gerald J. Foschini, "Layered Space–Time Architecture for Wireless communication in a Fading Environment When Using Multi–Element Antennas", *Bell Labs Tech. Jrnl*, Autumn 1996, pp. 41–59.

I. M. Kim et al., "Throughput Improvement Scheme in Multi–Code CDMA", *Electronics Letters*, vol. 34, No. 10, May 14, 1998, pp. 963–964.

H. Yoon et al, A Spread–Spectrum Multiaccess System With Cochannel Interference Cancellation for Multipath Fading Channels:, *IEEE Journal on Selected Areas in Comms.*, vol. 11, No. 7, Sep. 1993, pp. 1067–1075.

Dent et al., "CDMA–IC: A Novel Code Division Multiple Acess Scheme Based on Interference Cancellation", *Proc. Personal, Indoor and Mobile Radio Comms., 1992, PIMRC '92, Third IEEE Intl. Symp.*, 1992, pp. 98–102.

Kohno et al., "Combination of an Adaptive Array Antenna and a Canceller of Interference for DS–SS Multiple–Access System", *IEEE Journal on Selected Areas in Comms.*, vol. 8, No. 4, May 1990, pp. 675–682.

J. D. Laster, J. H. Reed, "Interference Rejection in Digital Wireless Communications", *IEEE Signal Processing Magazine*, vol. 14, No. 3, May 1997, pp. 37–62.

R. Kohno, "Spatial and Temporal Filtering for Co–Channel Interference in CDMA", *IEEE Third International Symposium on Spread Spectrum Techniques and Applications, 1994, IEEE ISSSTA '94*, vol. 1, pp. 51–60.

A. B. Carleial, "A Case Where Interference Does Not Reduce Capacity", *IEEE Trans. Information Theory*, Sep. 1975, pp. 569–570.

M. L. Honig, K. Steiglitz and B. Gopinath, Multichannel Signal Processing for Data Communications in the Presence of Crosstalk:, *IEEE Trans. Comm.*, vol. 38, No. 4, Apr. 1990, pp. 551–558.

J. H. Winters, "Signal Acquisition and Tracking With Adaptive Arrays in the Digital Mobile Radio System IS–54 With Flat Fading", *IEEE Trans. on Vehicular Technology*, vol. 42, Nov. 1993, pp. 377–384.

R. L. Cupo, G. D. Golden, C. C. Martin, K. L. Sherman, N. R. Sollenberger, J. H. Winers and P. W. Wolniansky, "A Four–Element Adaptive Antenna Array for IS–136 PCS Base Stations", *Proc. 1997 IEEE 47$^{th}$ Vehicular Technology Conference*, May 1997, pp. 1577–1581.

J. H. Winters, J. Salz, and R. D. Gitlin, "The Impact of Antenna Diversity on the Capacity of Wireless Communication Systems", IEEE Trans. on Communications, vol. 2, Feb./Mar./Arp. 1994, pp. 1740–1751.

* cited by examiner

REC. ORD. OF TRANS.     VERT. STACK OF DEC. STATS.

(12), (11), (10), (9) — NULL
(8) — NEXT
(7), (6), (5), (4), (3), (2), (1) — CANCEL

FIG. 4
FORMATION OF DECISION STATISTIC FOR $q_{(8)}(t)$

16-D SPACE

STEP 1: CANCEL INTERFERERS (1)–(7)

r •  - - - - - - - - - •  $u^{[8]}$
      401

402 — STEP 2: PROJECT ORTHOGONAL TO INTERFERERS (9)–(12)

• $v^{[8]}$

405 — DISTANCE² PROP. TO $SNR_{(8)}$

ORIGIN •

STEP 3: SCALED SPATIAL MATCH TO FORM SCALAR DEC. STATISTIC
$\langle v^{[8]}, d^{[8]} \rangle$ 403   405

WIRELESS COMMUNICATIONS SYSTEM HAVING A SPACE-TIME ARCHITECTURE EMPLOYING MULTI-ELEMENT ANTENNAS AT BOTH THE TRANSMITTER AND RECEIVER

This is a continuation of application Ser. No. 09/060,657 filed on Apr. 15, 1998 now U.S. Pat. No. 6,317,466.

TECHNICAL FIELD

The invention relates to a wireless communications system employing Multi-Element Antennas (MEAs) at both the transmitter and receiver.

BACKGROUND OF THE INVENTION

The transmission capacity (ultimate bit rate) of a digital wireless communications system is based on a number of different parameters including (a) total radiated power at the transmitter, (b) the number of antenna elements at the transmitter and receiver, (c) noise power at the receiver, (d) characteristics of the propagation environment, (e) bandwidth, etc. For a wireless transmission sysem employing an appreciable number of antennas at both the transmitter and receiver and operating in a so-called Rayleigh fading environment even without coding, the bit rate could be very large, e.g., 36 bits per second per Hz with a reasonable Signal to Noise Ratio (SNR) of 18 dB. Heretofore, it was difficult for a communications system to exchange data at a fraction of such a rate. The main reason for this is that the prior art did not appreciate the problems that had to be solved in order to building a large bit rate system.

SUMMARY OF THE INVENTION

We have recognized that a wireless communications system that transmits at a substantial bit rate may be achieved, in accordance with an aspect of the invention, by decomposing an m-dimensional system into m-one dimensional systems (of possibly a different capacity) when the transfer (H matrix) characteristics of the wireless channel are unknown to the transmitter. More specifically and in accordance with the principles of the invention, a burst of signal vectors is formed from different data symbols and then transmitted by a transmitter via a Multi-Element Antenna Array. The transmitted vector symbols are received as signal vectors by a plurality of different antennas associated with a wireless receiver. The symbol components of the transmitted vector symbol have an (arbitrary) order and the receiver determines the best reordering of these transmitted components and then processes the received vector to determine the reordered transmitted symbol components. Such processing starts with the lowest (e.g., first) level of the reordered components, and for each such level, cancels out interfering contributions from lower levels, if any, and nulls out interfering contributions from higher levels, if any.

Such receiver processing includes, in accordance with one embodiment of the invention, compensating the weaker of the received transmitted signal components by first removing the interference from the stronger of the received transmitted components, and then processing the result to form the bit decisions.

These and other aspects of the invention may be appreciated from the following detailed description, accompanying drawings and claims.

DETAILED DESCRIPTION

The following illustrative embodiment of the invention is described in the context of a point-to-point communication architecture employing a transmitter having an array of m antenna elements and a receiver having an array of n antenna elements, where, in an illustrative embodiment of the invention, $m \leq n$ and both values are >1. For example, for transmissions at 1.9 GHz, $m \leq 16$ and n=16. Moreover, as will be seen below, the bit rate/bandwidth, in terms of the number of bits/cycle, that may be achieved using the inventive architecture is indeed large.

Figure 1:
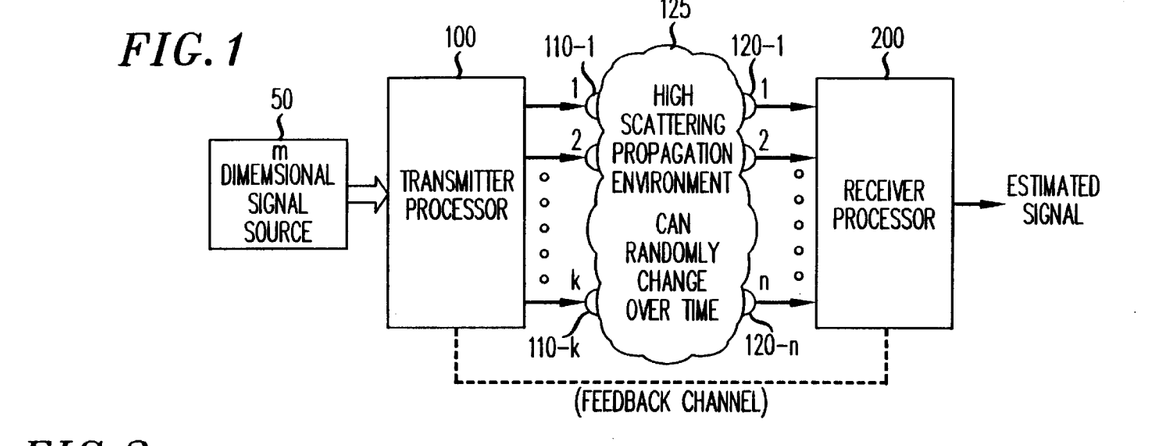
FIG. 1 illustrates in block diagram form a wireless transmitter and receiver embodying the principles of the invention.

For the sake of clarity, the detailed description assumes the following conditions. Specifically, assume that the transmitter and receiver, FIG. 1, are spaced very far apart, for example, 100λ. Also, the volume of such transmit and receive spaces is sufficient to accommodate one or more signal decorrelations. Also, locations of the transmitter and receiver may be reversed and several antennas would still be available at the receiver to receive substantially spatially decorrelated electromagnetic field samples originating from electromagnetic waves launched by the transmitter. This randomly faded matrix channel characteristic is assumed not to be known to the transmitter but may be "learned" by the receiver using certain channel measurements.

Such training may be done by, for example, using m applications of standard n-fold receive diversity, one such application per transmit antenna. One example of this procedure is disclosed in the article entitled "Signal Acquisition and Tracking with Adaptive Arrays in the Digital Mobile Radio System IS-54 with Flat Fading, by J. H. Winters and published in the IEEE Transactions on Vehicular Technology, November 1993, which is hereby incorporated by reference.

The following description is also discussed in the context of burst mode communications, in which temporal changes in the channel are assumed to be negligible over the duration of a burst of data, and in which the characteristics (i.e., transmission environment) of the channel may change from burst to burst. Because of this, the channel bit rate that may be achieved is treated as a random variable. Along with (m, n), a key system parameter is the spatial average Signal-to-Noise Ratio (SNR), ρ, as would be measured using a "probe" antenna element at the transmitter end and at the receiver end of the transmission volumes. The total radiated power is considered to be constrained so that if m, for example, is increased, there is proportionately less power per transmit antenna. (Note, that in a Rayleigh propagation environment, ρ is independent of the number of transmit antennas).

As mentioned above, the transmission environment of a channel is assumed to be random, and time is assumed to be discrete. Also assume the following notation:

The transmitted signal is designated as s(t) and the total power is constrained to $P_o$ (defined below) regardless of the value of m (the dimension of s(t)). For the sake of simplicity, the following discussion assumes that the bandwidth is sufficiently narrow so that the response of the channel may be considered to be flat over the channel frequency band.

The noise signal at the receiver is designated as v(t), and is a complex n-D (Dimensional) Additive White Gaussian Noise (AWGN) process with statistically independent components of identical power N (one component for each of the n receiver antennas).

The received signal is designated as r(t), and, at a particular point in time, a received n-D signal includes one complex component per receive antenna. In the case where there is only one transmit antenna, then the transmitter radiates power $P_o$ and the resulting (spatial) average power at the output of any of the receiving antennas is noted by P.

The spatial average SNR, $\rho$, at each receiver antenna is considered to be equal to P/N and independent of m in the Rayleigh propagation case.

The duration of a burst of data is $\kappa$ vector symbols and is assumed to be equal to the number of intervals ("ticks") of a discrete time clock that occurs in such a burst.

A so-called matrix channel impulse response, g(t), has m columns and n rows. G(f) is used for the Fourier transform of g(t). To be consistent with the narrowband assumption, this matrix/transform is considered to be constant over the band of interest, in which notation G indicates that frequency dependence is suppressed. Thus, except for g(0), g(t) is the zero matrix. As will be seen, it may be convenient to represent the response of the matrix channel in a normalized form, h(t). Also, related to G, and for a matrix H, the equation $P^{1/2} \cdot G = P_o^{1/2} \cdot H$ defines the relationship between G and H, which provide $g(t) = (P_o/P)^{1/2} \cdot h(t)$.

Further, realizations of a form of H for an ideal Rayleigh propagation environment may be modeled so that the m×n matrix entries are the result of independent identically distributed complex Gaussian variables of unit variance.

With the foregoing in mind, and using * to designate convolution, the basic vector equation describing the channel environment affecting a transmitted signal may be represented as follows:

$$r(t) = g(t) * s(t) + v(t) \quad (1)$$

The two vectors added on the right hand side of equation (1) are complex n-D(dimensional) vectors (i.e., 2n real dimensions). For the above narrowband assumption, equation 1 may be simplified by replacing the convolution using a matrix-vector product as follows:

$$r(t) = (P_o/(P \cdot m))^{1/2} \cdot h(t) \cdot s(t) + v(t) \quad (2)$$

A broad block diagram illustrating a generalized version of a communication system that processes the received vector signal described by equation 2 is shown FIG. 1. In particular, source 50 supplies a m-dimensional signal to transmitter processor 100 which then transmits over selected ones of the antennas 110-1 through 110-k a m-dimensional symbol generated as a result of using m instances of a particular modulation technique, e.g., Quadrature Amplitude Modulation (QAM), in which each symbol component corresponds to a group of sequential bits. In an illustrative embodiment of the invention, the selection of m transmit antennas may be arbitrary. However, the selection could turn out to be inferior. Rather than being "stuck" with such a selection, transmitter processor 100 is arranged to systematically (or randomly) change the selection of antennas to avoid being "stuck" with an inferior selection for any appreciable amount of time. (It is noted that in one embodiment of the instant invention, a so-called feedback channel from receiver 200 to transmitter 100 is provided. The selection of transmitter antennas is then somewhat optimized based on information provided by receiver 200 to transmitter 100 via the feedback channel (represented in FIG. 1 by the dashed line.) Transmitter processor 100, more particularly, may be arranged to initially match the sequential order in which symbols are generated with the order of antennas 110-1 through 110-k, in which the first of such symbols is transmitted over antenna 110-1, the second symbol is then transmitted over antenna 110-2, and so on. If that selection turns out to be inferior based on the receiver feedback information, then transmitter processor 100 may change the selection or use a subset of the transmit antennas 110-l, all in accordance with an aspect of the invention. For example, as a result of such feedback, if the transmitter "learns" that the environment of the channel over which antennas 110-k-1 and 110-k transmit, then processor 100 may use just a subset of the antennas, e.g., 110-1 through 110-k-2, and select those antenna that may possibly result in the best reception at receiver 200 as reported via the feedback channel.)

For the system of FIG. 1, m different QAM signals may be considered to be statistically independent, but are otherwise identical modulations (although different modulations are allowable). (Note that each of the QAM modulated components of a received vector will also be referred to herein as a substream.) Also for expositional convenience, q(t) may be defined as follows:

$$q(t) \Delta (P_o/(P \cdot m))^{1/2} \cdot s(t) \quad (3)$$

Using equation (3), equation (2) may then be expressed simply as $$r(t) = h(t) \cdot q(t) + v(t) \quad (4)$$

The received vector, r(t), is used to estimate the m QAM components of the vector q(t), in which n components of the signal vector, r(t), are received by each of the receiver 200 antennas 120-1 through 120-n, respectively. The processing of the received signal to detect the transmitted symbols is the problem that receiver 200 needs to solve in accordance with the principles of the invention. The detected symbols are then mapped to respective bit sequences to reconstitute the original bit stream.

Note, that for the sake of clarity and convenience, the following discussion relating to the processing of a received vector suppresses the argument (t). Thus, for example, r(t) will be referred to simply as r, q(t) as q, etc.

Figure 2:
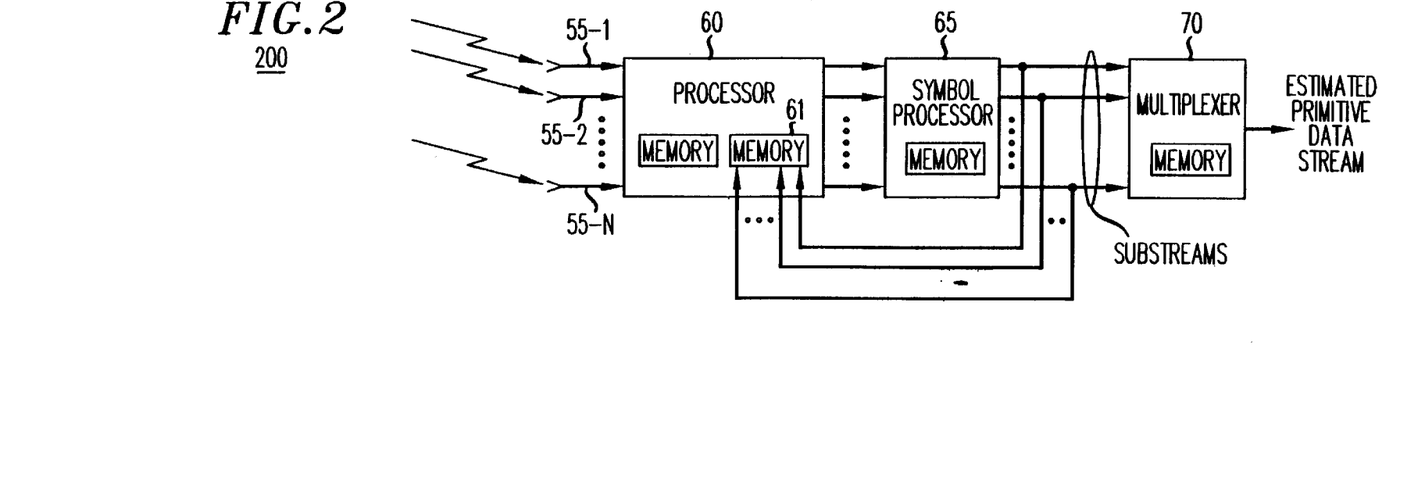
FIG. 2 illustrates a more detailed block diagram of the wireless receiver of FIG. 1.
Figure 4:
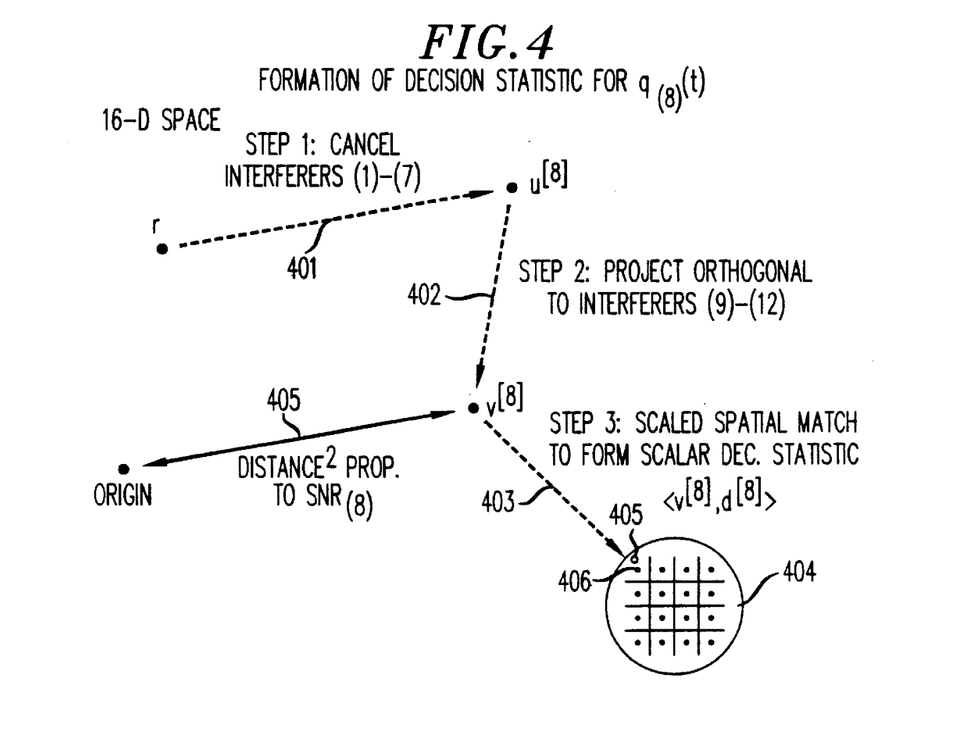
FIG. 4. illustrates graphically the way in which such processing is achieved to eliminate interfering signals from a signal vector being processed by the receiver of FIG. 2.

Receiver 200, FIG. 2, more particularly includes, inter alia, a bank of conventional RF receiver sections (not shown) which respectively interface with antennas 120-1 through 120-n. It also includes preprocessor (also just processor) 60, symbol processor 65 and multiplexer 70. Preprocessor 60 receives the signals as respective signal vectors from the n antennas 120-1 through 120-n, and preprocesses each received signal vector to eliminate interference between the signal components forming that vector. Such processing includes (a) subtracting interference stemming from previously detected transmitted symbols from the vector being processed, (b) nulling out of the vector being processed interference from other transmitted symbols that have not yet been processed and detected, and (c) using the stronger elements of the received signal to compensate for the weaker elements, all in accordance with the principles of the invention and as will be discussed below in detail. (Such processes are illustrated in FIG. 4 as procedures 401 through 407.) In accordance with an aspect of the invention, such compensation is achieved by determining the best reordering of the transmitted components for their detection and then processing the received vector to determine the reordered transmitted symbol components.

The reordering of the transmit components may be achieved by, for example, placing at the bottom of the vertical stack (level (1)) the detection process which will estimate the transmitted signal component that offers the largest SNR, then placing next in the vertical stack (level (2)) the detection process that will estimate the transmitted signal component having the next largest SNR of the remaining m−1 transmitted components and so on, as will be explained below in detail. (It can be appreciated from the foregoing that an alternative stacking arrangement could be readily used without departing from the spirit and scope of the instant invention)

A received vector has n complex components respectively received by antennas 120-1 through 120-n. Processor 60 further processes the preprocessed signal vectors to detect the m constituent data substreams. Symbol processor 65 processes the symbols to determine the data substreams (also herein "bit decisions") respectively corresponding to the symbols. Symbol processor 65 then stores the "decision bits" in memory 61 so that the decision bits may be used to cancel interference in further processing of the received signal vector. When all of the bits in a transmitted vector have been detected, then multiplexer 70 multiplexes the bits from the various substreams to form an estimate of the original data stream output by source 50 (FIG. 1).

Interference Cancellation

Figure 3:
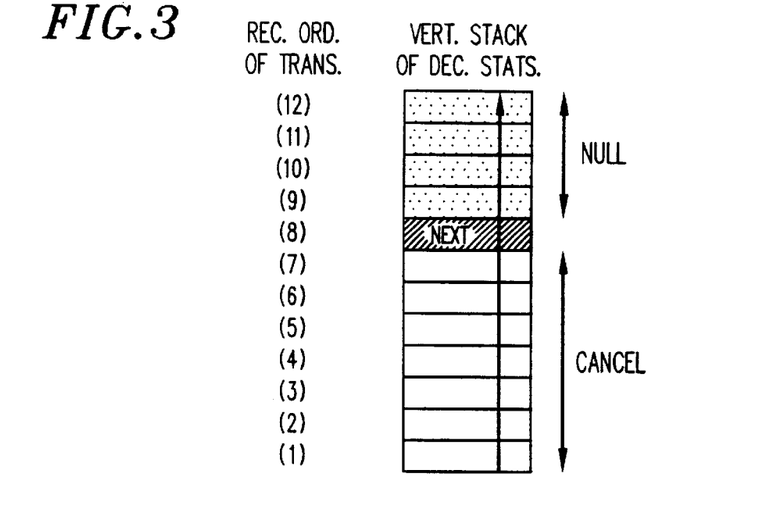
FIG. 3 illustrates the reordered transmit components and corresponding decision statistics for one of the n-dimensional complex signal vectors of a received burst of κ vectors.

For the following assume that receiver 200 receives a transmission burst of κ m-dimensional transmit vectors as impaired by the environment of channel 125 plus additive noise. (Note that the following discussion is given in the context of processing just one of the received vectors. It is to be understood of course that such processing/dectection equally pertains to each of the received vectors.) Each transmitted vector is received by n receiver antennas, e.g., 12 dimensional transmit vectors received via 16 antennas. Also consider that the decision statistics are to be stacked from the bottom up—i.e., as levels (1), (2), . . . (m) as shown in FIG. 3, in which the vector at the first (bottom) level offers the largest SNR for the first of the transmitted components that will be detected. For such an iteration of the vector signals, assume that receiver 200 has composed the first i−1 decision statistic vectors $d^{[\cdot]}$s for the levels up to the level designated "next" in FIG. 3 and that the i−1 decisions that are based on the decision statistics for (1), (2), . . . (i-1) are free of errors. Such decisions may be used to cancel interference stemming from the components of q that have been already determined. Note that $q_{(j)}$, j=1, 2 . . . m, denotes the reordered components of q corresponding to levels (1), (2) . . . (m). Also note that for the following discussion, it is useful to express h in terms of its m n-D columns so that (in discussing the formation of the decision statistic for detecting $q_{(i)}$) h=[$h_1$ $h_2$ . . . $h_m$].

Also note that the received signal, r, is the n-D vector expressed as follows:

$$r = q_1 \cdot h_1 + q_2 \cdot h_2 + q_3 \cdot h_3 \ldots + q_m \cdot h_m + v \quad (5)$$

Note that each of the m $h_{(j)}$ may be defined using (5) as $h_l$ (where:1≦l ≦m). From (5), $h_{(j)}$ is defined by the subscripted h that multiplies $q_{(j)}$ in (5). Also, r may be expressed as follows:

$$r = [q_{(1)} \cdot h_{(1)} + q_{(2)} \cdot h_{(2)} + \ldots + q_{(i-1)} \cdot h_{(i-1)}] + q_{(i)} \cdot h_{(i)} + [q_{(i+1)} \cdot h_{(i+1)} + q_{(i+2)} \cdot h_{(i+2)} + \ldots + q_{(m)} \cdot h_{(m)}] + v \quad (6)$$

Note, the first bracketed sum, [$q_{(1)} \cdot h_{(1)} + q_{(2)} \cdot h_{(2)} + \ldots + q_{(i-1)} \cdot h_{(i-1)}$], is assumed to involve only correctly detected signal components and is subtracted from r to give the n-D vector $u^{[i]}$ defined by:

$$u^{[i]} = [q_{(i)} \cdot h_{(i)}] + [q_{(i+1)} \cdot h_{(i+1)} + q_{(i+2)} \cdot h_{(i+2)} + \ldots + q_{(m)} \cdot h_{(m)}] + v \quad (7)$$

Thus, in the processing of the same received vector r that is designated "next" in FIG. 3 (i.e., stack level 8), processor 60 cancels (subtracts) from vector r the vector [$q_{(1)} \cdot h_{(1)} + q_{(2)} \cdot h_{(2)} + \ldots + q_{(7)} \cdot h_{(7)}$] as a result of having already determined/detected the latter vector. Processor 60 then "nulls" out of the vector being processed (e.g., the level 8 vector), the interference from transmitted signal components that have not yet been detected, i.e., the interference stemming from the transmission of $q_{(9)}$ through $q_{(12)}$, as shown in FIG. 3.

Interference Nulling Using Spatial Matched Filters

For those components (i+1) (i+2), . . . (m) of q that have not yet been determined/detected, $u^{[i]}$ may be projected orthogonal to the m-i dimensional space spanned by $h_{(i+1)}$, $h_{(i+2)}$, . . . $h_{(m)}$. The result of that projection is noted herein as $v^{[i]}$. The "interference nulling step"*, in a sense "frees" the detection process for $q_{(i)}$ of interference stemming from the simultaneous transmission of $q_{(i+1)}$, $q_{(i+2)}$, . . . $q_{(m)}$.

*In the asymptote of high SNR the incremental advantage of not nulling, but instead maximizing the signal to noise plus self-interference is negligible.

The direction and magnitude of the spatial-matched-filter vector $d^{[i]}$ is considered next. Note that $q_{(i)}$ multiplies each component of $v^{[i]}$ so that the vector $v^{[i]}$ is similar to the situation of receiving an [n-(i-1)]-fold diversity interference-free signal in vector AWGN. Explicitly, the decision statistic for $q_{(i)}$ is the scalar product $<v^{[i]}, d^{[i]}>$, in which the noise power of the scalar product is proportional to $\|d^{[i]}\|^2$. A standard result about optimum receive diversity may be used to represent the optimized signal to noise ratio, $SNR_{(i)}$. The resulting decision statistic also has the signal power that is proportional to $\|d^{[i]}\|^2$. It is thus convenient to define $v^{[i]}$ to denote the vector $v^{[i]}$ in the hypothetical situation where space 125, FIG. 1, is free of additive noise. The SNR(i) of that medium is optimized when $d^{[i]}$ is any multiple of the value $v^{[i]}$, as would follow by applying the well-known Cauchy-Schwarz inequality to the signal power term in the numerator in an expression for SNR. Indeed, the best of all of the opportunities for spatial filtering, is when the vector used in a scalar product to collapse $v^{[i]}$ to a scalar decision statistic is in the direction of $v^{[i]}$: The reason for this is that when the collapsing vector is proportional to $v^{[i]}$, the Cauchy-Schwarz upper bound on SNR is achieved with equality. Note that $\|v^{[i]}\|^2$ appears multiplicatively in both numerator and the denominator of the optimum SNR, therefore, the optimum SNR is invariant with respect to the $\|v^{[i]}\|$. While $d^{[i]}$ has the direction of $v^{[i]}$ the scale of $d^{[i]}$ is simply set in accordance with the (arbitrary) scale factor used for the decision regions employed in the final stage of QAM detection. (Note that the processes of canceling, nulling and compensating is shown graphically in FIG. 4, as mentioned above.)

Compensation

Processor 60 upon receiving a burst of signal vectors stores the signal vectors in memory 61. As is done conventionally, the burst may contain information which receiver 200 may use to "learn" the transmission characteristics of the transmission environment 125 (FIG. 1). Such conventional learning (or training) information may be positioned at, for example, either the beginning (preamble) or mid point (midamble) of a burst of signal vectors, as is well-known.

After storing the received training vectors in memory, processor 60 then determines the stacking order in which the transmitted data symbols should be detected as a function of their respective SNRs. This is done to minimize the probability of making a detection error in the processing of a burst of received vectors. The determination includes forming spatially-matched-filter vectors by iteratively determining the order in which the transmitted symbols in a vector symbol are detected from a received vector. Note that the goal of such re-ordering is to maximize the minimum signal-to-noise ratio of the detection process. Processor 60, more specifically, stacks the m decision statistics for the m components in accordance with the following criterion:

$$\text{maximize minimum } [SNR_{(i)}, 1 \leq i \leq m] \quad (8).$$

The reason that this criterion corresponds to minimizing the probability of a burst error is that in a high SNR situation (i.e., high $\rho$ situation) the probability that a burst contains at least one error could be dominated by the $q_{(i)}$ that has the least $SNR_{(i)}$ (as will be shown below in connection with equations (10) and (11).

Processor builds the stack using a so-called "myopic" optimization procedure, which turns out to be the global optimization procedure expressed by equation (8)—meaning that processor 60 starts at the bottom level of the stack and proceeds iteratively up to the m-th level, always choosing the next decision statistic among the options that maximizes the SNR for that level. With myopic optimization, processor 60 need only consider $\sim m^2/2$ options in filling the totality of all m stack levels as opposed to a thorough evaluation of m! stacking options.

(As an aside, note that the improved compensation feature may be achieved using an improved iterative solution that is somewhat more computational. Specifically, assume that processor 60 is proceeding next to the i-th stack level. Once it makes the i-th decision, assume that no error was made. For that case, then, processor 60 may subtract the complex number corresponding to the constellation point from the decision statistic. This process provides processor 60 with the value of the noise that was included in the i-th decision statistic. This noise is correlated with corresponding additive noises of decision statistics further up the stack. Consequently, each additive noise term in subsequent decision statistics can be adjusted by subtracting off the conditional expectation of that noise conditioned on all the contributions of the assumed known additive noises of decision statistics lower in the stack.)

Figure 5:
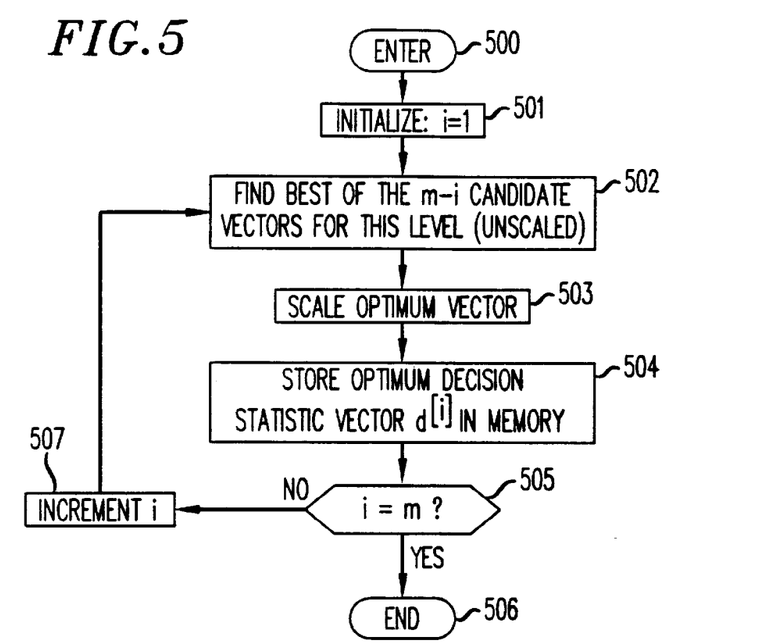
FIGS. 5 and 6 illustrate in flow chart form the program which implements such reordering in the processor 60 of FIG. 2.
Figure 6:
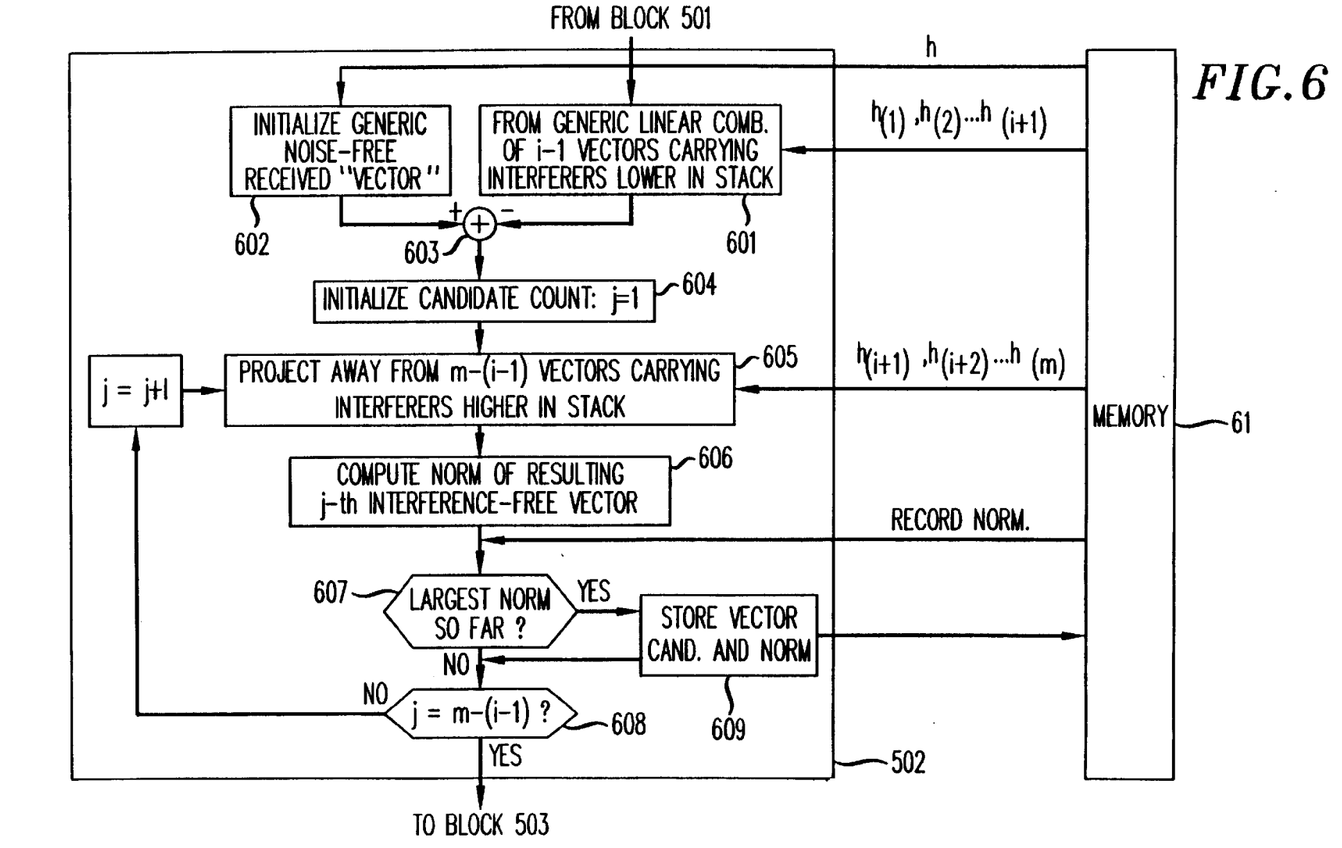

The program which implements the above described vertical ordering/layering in the processor 60 of FIG. 2 is shown in flow chart form in FIGS. 5 and 6. Specifically, FIG. 5 illustrates the way in which the optimum decision statistic vector $d^{[i]}$ for each of m stack levels, l=1, 2, 3, . . . m is determined. When the program is entered at block 500, following the storage of a received burst of signal vectors and the processing of the training information, the program proceeds to block 501 where it sets a variable i to a value of one and then proceeds to block 502. Processor 60, at block 502, processes the generic signal vectors to identify the spatial-matched-filter vector having the largest SNR of all of the candidates (as discussed above and as will be further discussed below). When processor 60 identifies that vector, it then (block 503) scales the vector relative to a respective scaling value. Processor 60 (block 504) then stores the scaled vector in memory 61. Processor 60 then stores the scaled vector in memory 61. Processor 60 then exits (blocks 505 and 506) if it determines that it has completed the forming and ordering (stacking) of all of the spatially-matched-filter vectors (i.e., I=m). If it has not completed the forming and ordering process, then processor 60 (blocks 505 and 507) increments i and returns to block 502 to find which of the remaining candidates offers the largest SNR and places that candidate next in the stack.

An expanded view of block 502 is shown in FIG. 6. In particular, assume that processor 60 has already stored the channel matrix in memory 61. Also assume that processor 60 has already stacked in the preferred order i−1 the matching vector candidates and that processor 60 is now forming the remaining (m−(i−1)) candidate vectors to determine which one of those candidates will be inserted at the ith level of the stack. At block 601, processor 60 froms a generic linear combination of the i-1 vectors positioned at the lower levels in the stack (and which have already been ordered in the stack), containing interferers. Processor 60 subtracts (block 603) that combination from the generic noise-free vector read (block 602) from memory 61, thereby leaving a representation of the vector for the transmitted signal components that have not yet been detected. Processor 60 then (block 604) initializes a variable j to a value of one to ensure that it will process all of the vector signals. For each vector candidate, e.g., the ith candidate vector, processor 60 (block 605) projects that vector orthogonally away from the (m−(i−1)) vector signal that interfere with the ith candidate vector to eliminate those interferers from the decision process. The resulting vector should be a vector that is free of interference from the other ones of the received vector signals. Processor 60 then (block 606) measures the norm (corresponding to the square of the length of the vector with respect to an origin in which each of the n components equals zero) to determine the value for that norm. The value of the norm is proportional to the SNR for that decision statistic. Processor 60 then determines (block 607) whether the SNR is the best (largest) SNR for all of the candidates processed thus far. If it is, then processor 60 stores (block 609) the spatially-matched-filter vector having that SNR and its associated norm in the ith level of the stack and then proceeds to block 608 to continue the processing of the remaining candidates. If it is not, then processor 60 goes directly to block 608. After storing the selected signal vector candidate and its norm in memory, processor 60 then checks to see if it is done. If not, processor 60 increments j and proceeds to block 605, otherwise, it proceeds to block 503, FIG. 5.

Accordingly, then, processor 60 operating under control of the foregoing program places, for detection, the transmitted signal components in an optimum order based on their respective SNRs. As discussed above, processor 60 then uses each of the stacked spatially-matched-filter vectors to determine a bit combination/decision that a processed symbol most likely represents. As mentioned above, the procedure for determining a symbol is illustrated in FIG. 4, and a discussion of that procedure is given in the context of FIGS. 7 and 8.

Figure 7:
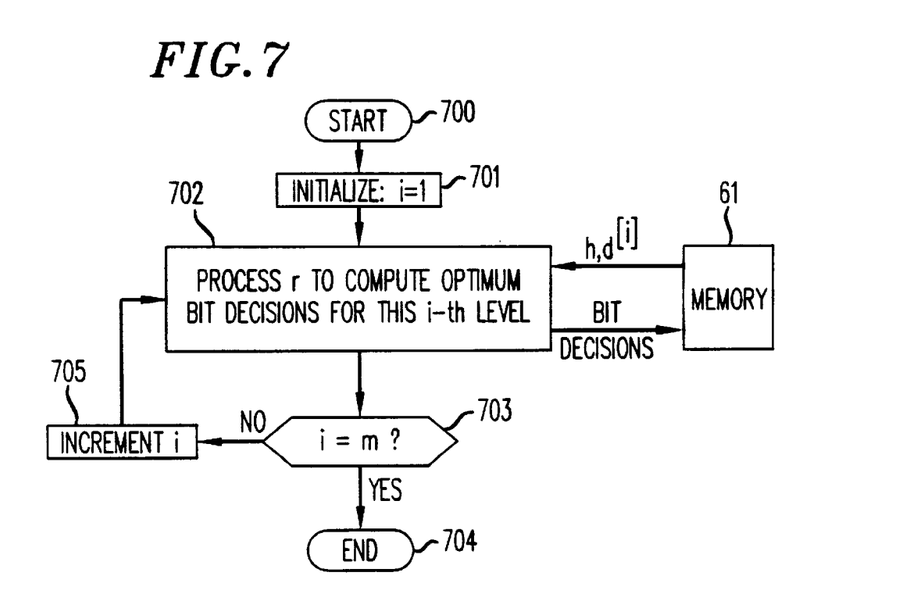
FIGS. 7 and 8 illustrate in flow chart form the processor program which processes each received vector signal to determine the corresponding transmit symbols.

Specifically, the program which implements in processor 60 (and somewhat in processor 65) the above nulling, canceling and matching steps 401, 402 and 403 illustrated in FIG. 4 are shown in flow chart form in FIGS. 7 and 8. Starting with FIG. 7, processor 60 begins such processing by entering the program of FIG. 7 at block 700. At that point, processor 60, initializes (block 701) a variable i to a value of 1 and uses i to point to a respective level in the formed stack. For the following discussion, assume that processor 60 is processing the ith level in the stack. Processor 60 (block 702) processes the vector signal (as shown for procedures 401, 402 and 403, FIG. 4) positioned at the ith level in the stack to determine the symbols $q_{(i)}$ most likely represented by the signal vector. Processor 60 stores the bit decisions corresponding to $q_{(i)}$ in memory 61, and then checks (block 703) the value of i to see if it has completed m successive processings of the received vector signal r. If so, then processor 60 exits the program. Otherwise, processor 60 (block 705) increments i to point to the next succeeding level in the stack and proceeds to block 702 to process the received signal vector in a manner corresponding to that level.

Figure 8:
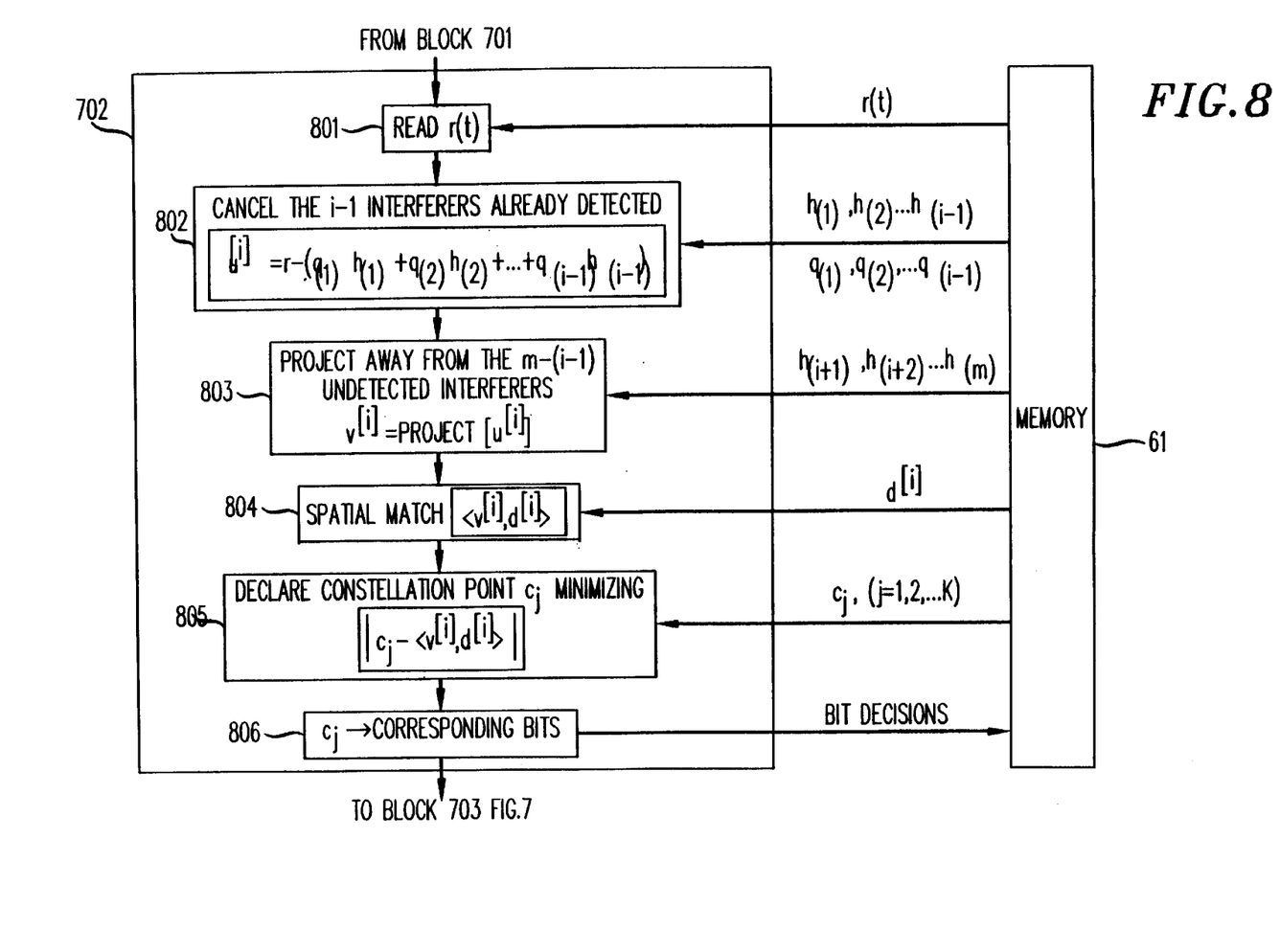

An expanded version of block 702 is shown in FIG. 8. Specifically, at block 801 processor 60 reads from memory 61 the received n-dimensional vector signal r(t), and then reads (block 802) from memory 61 those signal vector components that have already been processed/detected in accordance with block 702, i.e., those components below the ith level in the stack. Then, in the manner discussed above, processor 60 cancels the i-1 retrieved signal vectors $q_{(1)} \cdot h_{(1)}, q_{(2)} \cdot h_{(2)}, \ldots q_{(i-1)} \cdot h_{(i-1)}$, of r and the proceeds to block 803 with a signal vector substantially devoid of interference from those i-1 vectors. Processor 60 then projects the resulting vector away from the interferers that have not yet been detected. That is, processor 60 reads from memory the spatial match vector $d^{[i]}$ determined at block 504 for the ith level of the stack. Processor 60 (cooperating with processor 65) then (block 804) takes the scalar product of the spatial match vector and the result generated at block 803 to generate a complex number.

Processor 65 (805) then determine which one of a conventional multipoint signal constellation, e.g., a sixteen point signal constellation (as shown for constellation 404, FIG. 4), is closest to the complex number. An example of such a point is shown in FIG. 4 in which point 407 representing the complex number is closest to the constellation point of quadrant 406. Processor 65 (block 806) then stores the data bit decisions represented by the identified constellation point in memory and then returns control to processor 60. Processor 60 then proceeds to block 703 to process the next level in the stack.

When the received signal vector has been so processed and all symbols detected, with the corresponding bits decisions stored in memory, then multiplexer 70 (FIG. 2) multiplexes the bit decisions to an output terminal.

The advantages of the foregoing may be appreciated by way of an example based on a particular set of parameters, in which, for example; $\rho$=18 dB, and (m,16) with m$\leq$16, and in which transmitter 100 and receiver 200 (FIG. 1) may have antenna arrays of up to 16 antennas. Also, assume that 95% of the transmission bursts are free of errors (i.e., at most a 5% outage), and an ideal Rayleigh propagation environment for space 125. Further assume that each burst contains, besides training vectors, 100 vector symbols. For the assumed parameters and 16×16 system, the Shannon capacity is 79.1 bps/Hz. (Note that "Shannon capacity" is a well-known term in the art.)

The number of transmit antennas, m, and the number of points in each of the planar constellations, K, may be optimized to maximize the number of bps/Hz. The number of constellation points in m-D (or n-D) complex space may be expressed as follows:

$$\text{Number of constellation points} = [\text{Number of 2-D constellation points}]^{[\text{Number of substreams}]} = K^m \quad (9)$$

The optimization process involves performing the following procedure to iteratively explore m=1, 2, 3, ... 16. For each of these cases, as many bits per 2-D constellation may be used, to the point where one more bit would violate the so-called 5% "outage constraint"[1]. $\neq$[1] When the number of constellation points was greater than two and not a perfect square we used a regular constellation with good distance properties. For example, for an 8 point constellation we used a square with four equilateral triangles attached to the four sides and pointing outward. The vertices of the square, along with the four triangle vertices that oppose each of the four sides of the square, made up the constellation.

The equation for the probability of at least one error in a block with $\kappa$ vector symbols is shown below as equation (10). Evaluation of this probability requires that the $SNR_{(i)}$ for $1 \leq i \leq m$. Monte-Carlo generated H realizations may be used to get samples of the m SNRs. For K point QAM constellations the formula in the large $\rho$ realm is $$Prob[\text{Erroneous Block}] \approx \kappa \times \sum_{i=1}^{m} P_b(SNR_{(i)}) \quad (10)$$

where $P_b(.)$ is the well known function for the probability of bit error of a 2-D constellation as a function of SNR, namely:

$$P_b(SNR_{(i)}) \approx [(K^{1/2}-1)/(K^{1/2} \cdot \log_2 K)] \times \rho^{-1/2} \int_{\alpha}^{\infty} \exp(-x^2) dx \quad (11)$$

where $\alpha = [(3 \cdot SNR_{(i)})/(2 \cdot (K-1))]^{1/2}$.

Using equations (9) and (10), and starting with m=1 the system of FIG. 1 may support K=128 point constellations or equivalently 7 bps/Hz. For m=2 the system can support a 32 point planar constellation of 5 bps/Hz. For m=7, the system can support 16 point constellations of 4 bps/Hz. For m=12, the system can support 3 bps/Hz, which is one of the higher dimensional constellations of $8^{12}$=68,719,476,736 points or 36 bps/Hz.

The foregoing is merely illustrative of the principles of the invention. Those skilled in the art will be able to devise numerous arrangements, which, although not explicitly shown or described herein, nevertheless embody those principles that are within the spirit and scope of the invention. For example, instead of maintaining a constant BER and outage probability, the skilled artisan could maintain a constant transmitted power, and express the relative merit of the two approaches in terms of a difference in outage probability as a function of rate. As another example, the skilled artisan could hold the BER and outage probability constant for both systems, and express the relative merit in terms of transmitter power, or, the life of a battery in a portable system.

In addition, those skilled in the prior art would recognize from the foregoing that the notion of using more transmit antennas than transmit radios at the transmitter and selecting a subset of antennas on which to transmit, could be similarly applied to the receiver. In that case, more receive antennas would be deployed than receive radios and a subset of the receive antennas on which to receive a transmitted vector signal would be selected.

Those skilled in the relevant art would also recognize from the foregoing that in certain applications of the claimed invention it may be desirable to use only a subset of the inventive features. For example, it may be desirable to use just nulling but not cancellation and reordering, or else nulling and cancellation but not ordering.

We claim:

1. A wireless transmitter comprising
   a source of a stream of symbols,
   a plurality of transmitter antennas, and
   a transmitter processor which demultiplexes the symbol stream into an actively selected number, m, of substreams of symbols and which then transmits each substream of symbols over an actively selected one and only one of the transmitter antennas using a predetermined modulation technique and over a common frequency band shared, at the same time, by other selected transmitter antennas, said selected number m being based on information received via a feedback channel from a receiver to said wireless transmitter.

2. The transmitter of claim 1 wherein said plurality of transmitter antennas is greater than m antennas, where m>1, and wherein the selection of the m transmitter antennas used to transmit the m substreams of symbols is a selected subset of the antennas.

3. The transmitter of claim 1 wherein which of the transmitter antennas is employed as said m actively selected antennas is randomly changed prior to transmission of a group of symbols.

4. A wireless transmitter comprising a source of a stream of symbols, a plurality of transmitter antennas, a transmitter processor which demultiplexes the symbol stream into m substreams of symbols and which then transmits each substream of symbols over a selected one of the transmitter antennas using a predetermined modulation technique and over a common frequency band shared by other selected transmitter antennas, a receiver for receiving the transmitted symbols, and a feedback channel from the receiver to the transmitter and wherein the transmitter processor optimizes the selection of the transmitter antennas based on signal propagation environment information that the receiver supplies to the transmitter via the feedback channel.

5. A wireless transmitter comprising a source of a stream of symbols, a plurality of transmitter antennas, a transmitter processor which demultiplexes the symbol stream into m substreams of symbols and which then transmits each substream of symbols over a selected one of the transmitter antennas using a predetermined modulation technique and over a common frequency band shared by other selected transmitter antennas, a receiver for receiving the transmitted symbols, and a feedback channel from the receiver to the transmitter and wherein the transmitter processor transmits symbol components forming a vector symbol over respective ones of a selected set of transmit antennas and wherein the transmitter changes the selected set of transmit antennas based on signal propagation environment information supplied by the receiver via the feedback channel.

6. A wireless transmitter comprising a source of a stream of symbols, a plurality of transmitter antennas, a transmitter processor which demultiplexes the symbol stream into m substreams of symbols and which then transmits each substream of symbols over a selected one of the transmitter antennas using a predetermined modulation technique and over a common frequency band shared by other selected transmitter antennas, and a feedback channel from a receiver of the transmitted symbols to the transmitter and wherein the transmitter transmits a vector symbol over a subset of the plurality of transmitter antennas, in which the subset is selected based on signal propagation environment information received from the receiver via the feedback channel.

7. The transmitter of claim 1 wherein the selection of which of said transmitter antennas is employed is optimized based on signal propagation environment information that the receiver supplies to said transmitter via said feedback channel.

8. The transmitter of claim 1 wherein the selection of which of said transmitter antennas is employed is supplied to said transmitter via said feedback channel.

9. The transmitter of claim 1 wherein said selected number m itself is received via a feedback channel from a receiver to said wireless transmitter.

* * * * *